N. ADAMS.
Running-Gear.
No. 34,342. Patented Feb. 11, 1862.
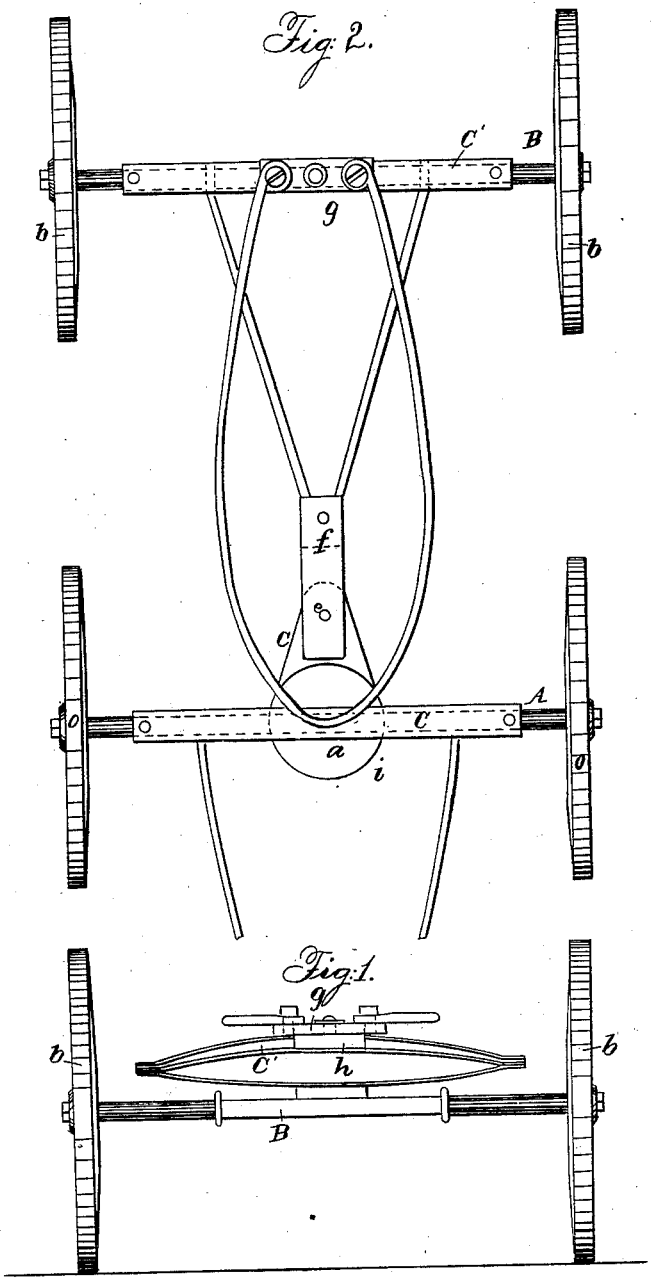

UNITED STATES PATENT OFFICE.

NATHANIEL ADAMS, OF CORNWALL, NEW YORK.

RUNNING-GEAR OF CARRIAGES.

Specification of Letters Patent No. 34,342, dated February 11, 1862.

*To all whom it may concern:*

Be it known that I, NATHANIEL ADAMS, of Cornwall, in the county of Orange and State of New York, have invented new and useful Improvements in the Running-Gear of Carriages; and I do hereby declare that the following is a full, clear, and exact description of the same, reference being had to the accompanying drawings, making a part of this specification, in which—

Figure 1, is a back end view of a carriage embodying my invention. Fig. 2, is a plan of the same.

Similar letters of reference indicate corresponding parts in the several figures.

This invention is particularly designed for light carriages though it is equally applicable to all kinds of four wheeled vehicles which are hung upon elliptic springs.

The object of the invention is to allow the carriage or other vehicle to which it is applied to turn in a small compass and it consists in an arrangement for turning the hind axle of the carriage by and simultaneously with the front axle, and in opposite direction.

To enable others skilled in the art to fully understand and construct my invention I will proceed to describe it.

A, and B, represent respectively the front and hind axles of a light pleasure wagon mounted on wheels $a$, $a$, $b$, $b$.

C, C', are elliptic springs the latter of which C', is permanently secured on top and in the center of the hind axle and the former to the upper half of the fifth wheel $a$, of the carriage, and with it is secured to the front axle by a king bolt passing through the axle in the usual manner.

The lower half of the fifth wheel $b$, is permanently secured to the front axle A, and has an arm $c$, projecting from its back side which arm is connected by a pivot $e$, to the front end of the perch, or reach $f$, which is attached at its back end to the hind axle B, and connects the two axles together.

The body of the carriage is rigidly attached in front to the elliptic spring on the front axle and at its back end is supported upon and attached to a plate $g$, which is pivoted to another plate $h$, attached on top of the elliptic spring C', on the hind axle so as to allow the hind axle to have movement independent of the carriage body and in opposite direction from the front axle.

The connection between the front and hind axles being non-elastic the axles in turning the carriage, are drawn closer together, which difference is compensated for by the springs, and the body and axles relieved from strain by means of the pivoted connection with the body which allows the axles to be cramped to turn the carriage, without detracting in the least from the efficiency of the spring.

Instead of the body of the carriage being attached to a pivoted plate on the spring of the hind axle it may be attached rigidly to the spring and the spring secured to the axle by a king bolt the same as the spring on the forward axle the only difference between the two modes of connection being that the former gives less side motion to the carriage than the latter the result otherwise being precisely the same.

I am aware that it is not new to have both of the axles pivoted separately, so that both wheels on one side will cramp simultaneously. This I do not claim, but

Having thus described my invention what I claim as new and desire to secure by Letters Patent, is:

The arrangement of the arm $c$, perch $f$, and pivot $e$, with the independently pivoted axles A, B, as herein shown and described for the purpose set forth.

NATHL. ADAMS.

Witnesses:
JAMES LAIRD,
CHARLES HOLDEN.